United States Patent
Yankovsky (10) Patent No.: US 7,383,387 B2
(45) Date of Patent: Jun. 3, 2008

(54) DOCUMENT TRANSFORMATION TOOL

(75) Inventor: Dmitry Yankovsky, Walldorf (DE)

(73) Assignee: SAP AG, Walldorf (DE)

( * ) Notice: Subject to any disclaimer, the term of this patent is extended or adjusted under 35 U.S.C. 154(b) by 570 days.

(21) Appl. No.: 10/319,385

(22) Filed: Dec. 13, 2002

(65) Prior Publication Data

US 2004/0117381 A1    Jun. 17, 2004

(51) Int. Cl.
    *G06F 12/00* (2006.01)
(52) U.S. Cl. .................................................. 711/118
(58) Field of Classification Search ............... 707/100, 707/1; 704/2; 715/523; 711/136, 118
See application file for complete search history.

(56) References Cited

U.S. PATENT DOCUMENTS

| | | | | |
|---|---|---|---|---|
| 5,906,000 | A * | 5/1999 | Abe et al. | 711/151 |
| 6,941,511 | B1 * | 9/2005 | Hind et al. | 715/523 |
| 7,134,075 | B2 * | 11/2006 | Hind et al. | 715/513 |
| 2001/0001873 | A1 * | 5/2001 | Wickeraad et al. | 711/136 |
| 2002/0065842 | A1 * | 5/2002 | Takagi et al. | 707/500 |
| 2003/0014237 | A1 * | 1/2003 | Macklin | 704/2 |
| 2003/0163442 | A1 * | 8/2003 | Andreev et al. | 707/1 |
| 2004/0054748 | A1 * | 3/2004 | Ackaouy et al. | 709/214 |

OTHER PUBLICATIONS

Jim Handy, "The cache Memory Handbook: The Authoritative Reference on Cache Design," 2nd edition, Academic Press, 1998, p. 57.*

* cited by examiner

*Primary Examiner*—Matthew Kim
*Assistant Examiner*—Sheng-Jen Tsai
(74) *Attorney, Agent, or Firm*—Mintz, Levin, Cohn, Ferris, Glovsky & Popeo, P.C.

(57) ABSTRACT

Systems and techniques are described for using a memory cache of predetermined size to map values in a source file to a result file. In general, in one implementation, the technique includes determining values in the source file called for in the result file. The called-for values are ordered in a hierarchical order of usage in the result file from a first called-for value towards a last called-for value. The source file is sequentially parsed to locate called for values and the values are stored in memory cache locations. The called-for value with the lowest priority in the cache may be replaced by a newly found called-for value having a higher priority.

16 Claims, 6 Drawing Sheets

DOCUMENT TRANSFORMATION TOOL

BACKGROUND OF THE INVENTION

The present application relates to mapping values from a source file into a result file.

Documents, referred to as result documents, may use values from other documents that may be referred to as source documents. For example, a result document may be a listing of customer names: first name then last name. The values for the first and last names may be located in a source document of customer information that includes the first and last names of customers and may also include other information such as a customer address and number, for example.

The values in the source document may not be in the same order that the values are used, or called-for, in the result document. Continuing with the example, the customer's name in the source document may be first name then last name. The first and last name values in the source document also may be separated by other values. The result document may call for the value for last name followed by the first name.

Some document types only may be accessed, also referred to as parsed, sequentially. An extensible mark-up language (XML) document is an example of a document that may only be parsed sequentially. Sequentially accessible files may only be parsed in one direction, from beginning to end, for example. The value for first name in the source document is sequentially before the value for last name in the example above. The result file first calls for the value of customer last name. The source document may be parsed sequentially until the value for customer last name is located. The value for last name then may be provided for use in the result document. The result document next calls for the value of first name from the source document. Because the source document may only be parsed sequentially and the value for the customer first name has been passed, the parser, in this example, must restart parsing from the beginning of the document to locate the customer first name. In order to reduce the re-parsing of the source document, the values called for by the result document may be stored in a values storage cache until they are needed. In the example, the value for the customer first name may be stored in the value storage cache until the value for the customer last name is located. The values for last name and first name may both be stored in the values storage cache and provided to the result document when called for.

SUMMARY OF THE INVENTION

The present invention provides methods and apparatus, including computer program products, for mapping values from a source file into values in a result file. In general, in one aspect, using a memory cache of predetermined size to map values in a source file to a result file is facilitated by determining values in the source file called for in the result file; ordering the called-for values in a hierarchical order of usage in the result file from a first called-for value towards a last called-for value; and sequentially parsing called-for values from the source file into memory cache locations wherein a called-for value lowest in the hierarchical order is replaced by a called-for value higher in the hierarchical order when the cache is full.

In another aspect, the mapping of values in a source file to a result file is facilitated by populating the result file with called-for values from the memory cache mapped from the source file to the result file; and repeating the parsing and populating until all the called-for values are mapped to the result file.

The source file may be an Extensible Mark-up File.

The result file may be an Extensible Mark-up File.

Other aspects include an article comprising a machine-readable medium storing machine-readable instructions that, when executed, cause a machine to perform the disclosed techniques, and/or a system that includes one or more computers configured to implement the disclosed techniques.

The systems and techniques described here may provide one or more of the following advantages. In some implementations, the techniques may used to control the amount of memory that needs to be allocated to a memory cache used in the mapping of the source file to the result file. The techniques can reduce the number of passes that a parser needs to make through a source file in order to locate the values called for in the result file. Users of the system only need to specify the called-for result values and not be concerned with the technique used to acquire the values.

The details of one or more implementations of the invention are set forth in the accompanying drawings and the description below. Other features and advantages of the invention will become apparent from the description, the drawings, and the claims.

DETAILED DESCRIPTION

The systems and techniques described here relate to a document transformation tool that populates a result document with values from a source document. A controller keeps track of values from the source document that are called for in the result document and the priority order in which the values are required. A parser sequentially parses the source document collecting the called-for values as they are located and storing the called-for values in a storage cache. If additional values are located after the cache is filled, the document transformation tool retains the values having the highest priority order. When the highest priority value is located, it may be mapped into the result document. The next highest priority value may be in the cache and may also be mapped to the result document and so on down the priorities. The parser may be repeatedly required to pass through the source document to locate values that could not be stored in the cache. The mapping framework disclosed herein may reduce the number of passes that a parser makes through a source document in order to populate a result document.

Figure 1:
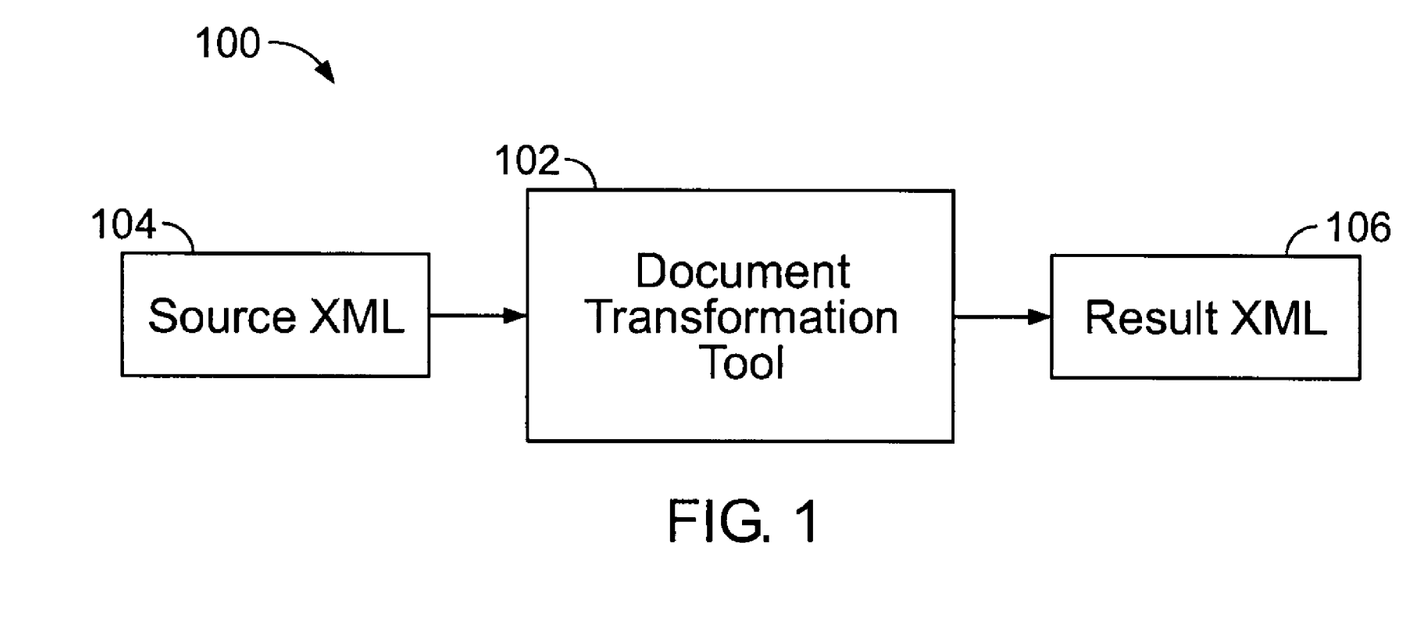
FIG. 1 is a block diagram illustrating the relationship between the document transformation tool transformation engine and a source document and a result document.

FIG. 1 illustrates a block diagram 100 of the relationship between the document transformation tool transformation engine 102 and the source document 104 and result document 106. Values in some documents, extensible mark-up language (XML), for example, only may be accessed sequentially. To access a value at point A in the document followed by a value at point Z in a sequential access system, one must pass through all intervening points. In contrast, values in a random access system may be selected in any order without accessing intervening values. The source and result documents 102, 104 are shown as XML documents. XML documents are sequentially accessible and may be used for illustration throughout the disclosure to mean a sequential document although the document transformation tool may be used with other sequentially accessible document types. The document transformation tool 102 controls the locating of values in the source XML 102 and subsequent providing of those values to the result XML.

The source XML 104 may have the values called for by the result XML 102, however the values in the source may be arranged in a different order than required in the result. For example, the source may have listing of last names and then first names. The result may require that the value of first name be listed before the last names. Both the source and result files only may be parsed sequentially. Because the result document must be populated with values in sequential order, a sequential file mapping has to search the source and store the last name; continue searching sequentially until the first name is found and only then be able to provide the higher priority, or sooner called-for, first name value to the result document. If, in this example, the document transformation tool could only store one value, the tool would not be able to cache the last name value. The document transformation tool would have to re-parse the source document to locate the last name value after the tool had located the first name.

Figure 2:
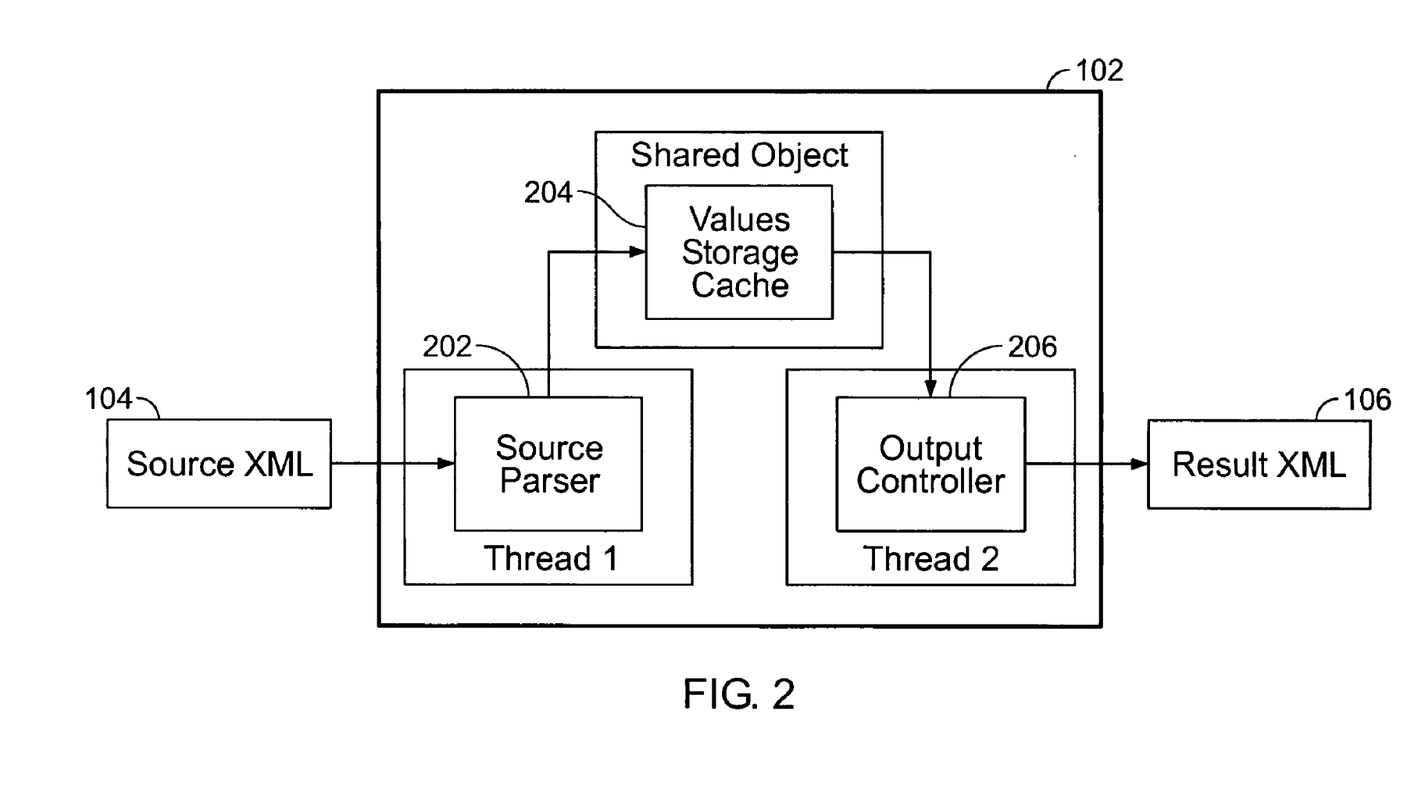
FIG. 2 is a block diagram of an implementation of a document transformation tool transformation engine.

FIG. 2 illustrates a block diagram of an implementation of a document transformation tool transformation engine 102 including a source parser 202, a values storage cache 204 and an output controller 206. The source parser 202 receives input in the form of sequential source data from the source XML 104 including, program instructions, interactive online commands, markup tags, or some other defined interface and breaks the data up into parts that may then be managed by other programming. As the source parser 202 locates values called for in the result XML, the values may be stored in an areas of memory that may be referred to as a values storage cache 204. The size of the cache is a factor in determining the number of values that may be stored in the cache. It may be advantageous, in some circumstances, to reduce the size of the cache. An output controller 206 provides the values from the cache 204 to the result XML 106.

The cache may be referred to as a shared object because both the parser 202 and the controller 206 access this object while operating simultaneously. The parser and the controller are each in separate threads. A thread may be one of several paths or routes of execution inside a single program, routine, process or context. Threaded programs allow background and foreground action to take place without the overhead of launching multiple processes or inter-process communication. Because the parser and the controller are separate threads, one or the other may be suspended while the other continues to execute.

Figure 3:
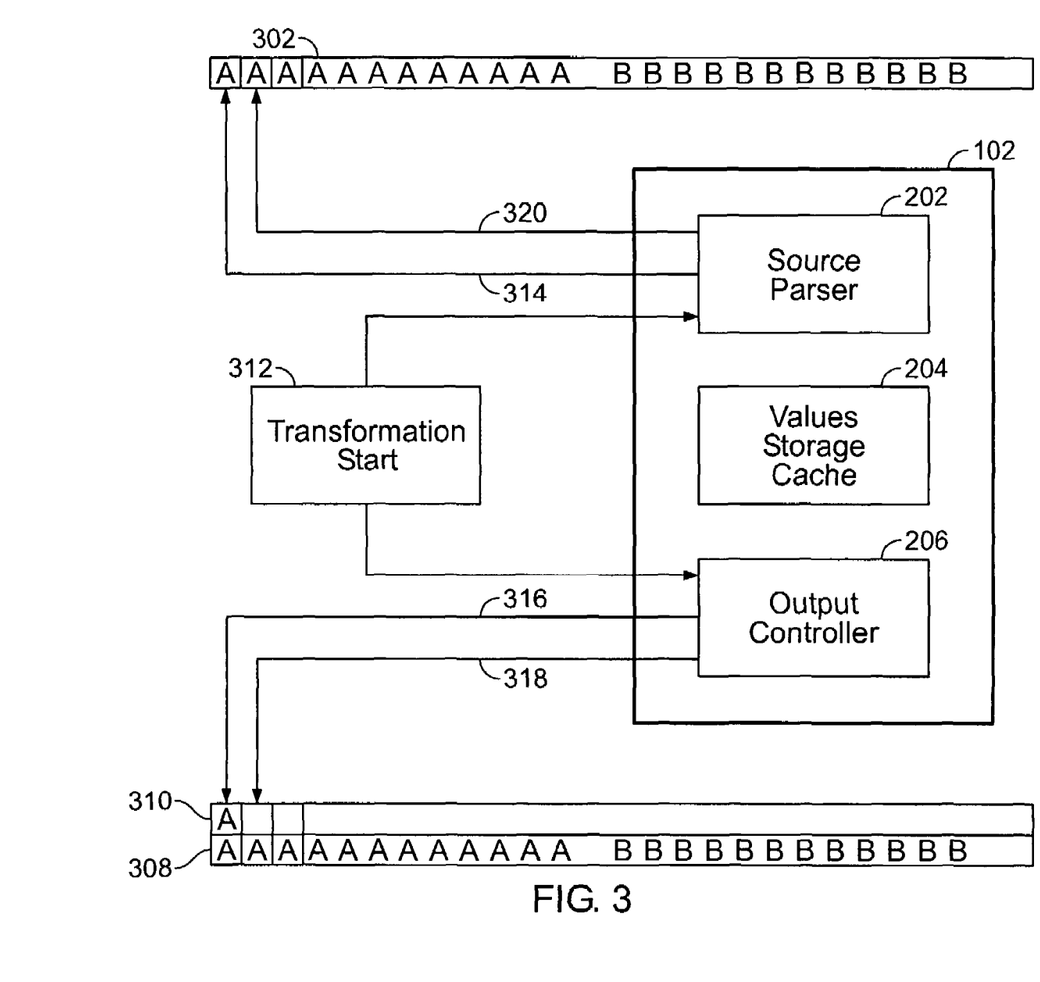
FIG. 3 is a block diagram illustrating the operation of a document transformation tool engine.

FIG. 3 is an illustration of the document transformation tool applied to a transformation of values from a source document to a result document. The document transformation tool 102 creates a mapping of values between a source document 302 and a result document 308. Result document 310 shows the result document called-for value 308 as values are populated into the result document. In the illustrated example, the source document 302 has a series of values having the tag A followed by a series of values having the tag B. Tag A could, for example, represent a first name value and tag B a last name value. The result document 308 of this example requires the same values in the same order.

The pointers 314, 316 point to where, sequentially, the document transformation tool is operating on the source and result documents, respectively.

A transformation start command 312 starts the document transformation tool 102. The transformation start 312 starts execution of both the source parser 202 and the output controller 206. The output controller 206 "knows" the required result structure 308 and requests, in this example, an A value from the values storage cache 204. No values are in the storage cache 204 because the parser has not yet begun to parse the source document 302. Thread 2, the process operating the output controller 206, sleeps awaiting the locating of the requested value. The source parser 202 parses the source document and, in this example, locates the A value in the first parse 314. The value is stored in the values storage cache 204. The values storage cache 204 recognizes that the requested A value is in storage and wakes up thread 2, the output controller 206. The output controller 206 populates the value in the result document 310 in the position at the pointer 316. The output controller moves sequentially in the result document to the next location at pointer 318. The output controller 206 requests the next value called for, another A value. Repeating, the parser 202 moves sequentially in the source document 302 to the next location at pointer 320. Again, the A value is located and populated into the result document as described above. This process repeats until the result document is fully populated with values from the source document.

Figure 4:
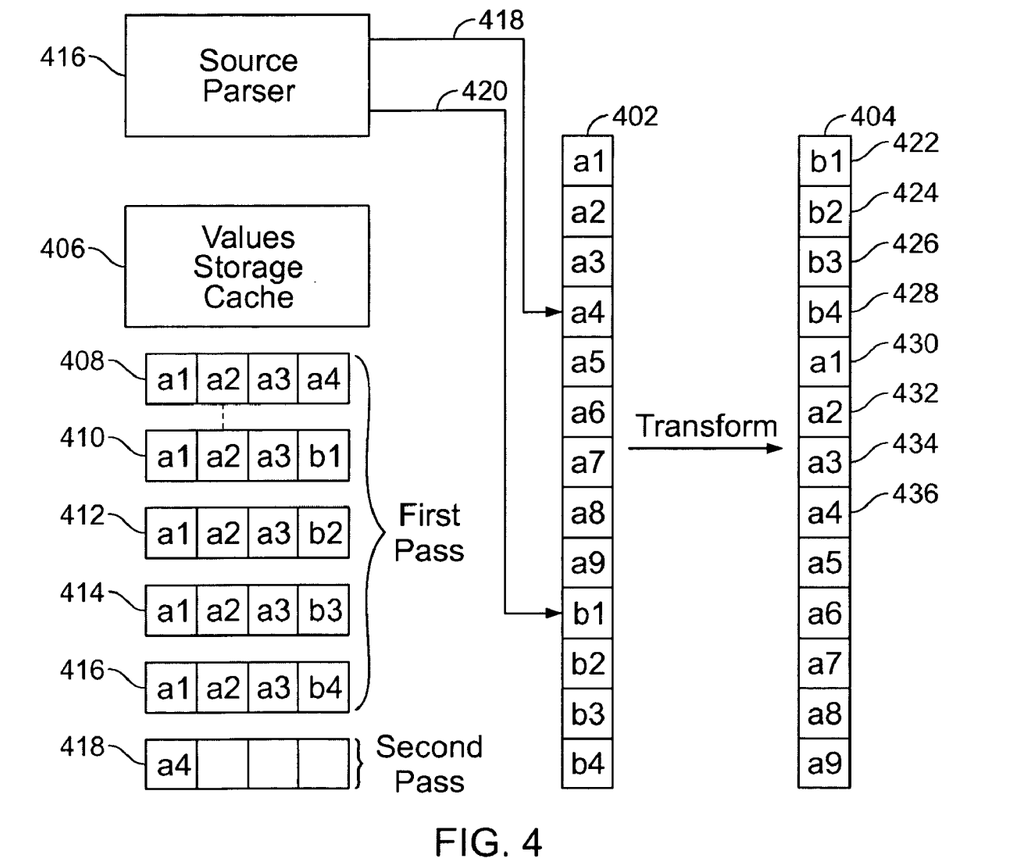
FIG. 4 is an example of values stored in a storage cache by the transformation tool based on the priority of the values.

FIG. 4 illustrates an example of the values stored in a values storage cache 406 in the case where the order of the values in a source document 402 are different from that called for in a result document 404. In this example, all the values in the source document 402 are called for in the result document 404. The values are sequentially called for in the result document in a different order than the values sequentially appear in the source document. The values called for by the result document may be prioritized in order of need from a highest, or first called for, to a lowest, or last called-for value. In the example, b1 is called for first followed by b2, b3, b4, a1, and so on as shown in the result document 404.

The values storage cache 406 of the example is sized to store four values to illustrate the operation of the document transformation tool where the cache 406 is not large enough to store all the values called for by the result document. As a source parser 416 parses the source document 402, values called for by the result document 404 may be stored in the values storage cache 406. In the illustrated example, all values in the source document are called for in the result document. However, if the source document had values not called for in the result document, then the output controller (not shown) would not request, and the parser would not retrieve, the uncalled-for values.

Continuing with the example, the parser 416 moves sequentially through the source document 402 storing values called for in the result document 404. The values stored in the storage cache 406 during the parser's first sequential pass through the source document are shown 408-416 as described herein. When the parser pointer 418 points to value a4, the storage cache will contain the values a1-a4 as shown 408 because each value located is called for in the result document. As the parser continues the first sequential pass through the source file, the parser locates called-for values a5, a6, a7, a8 and a9, in that order. Because the newly found values a5-a9 have a lower priority, that is, they are called for later in the result document, than the currently stored values a1-a4, the storage cache retains the higher priority values a1-4.

When the parser pointer 420 reaches the value b1 in the source document, that value, b1, replaces a4 in the values storage cache 410 because b1 is called for in the result document 404 before any of a1-a4 and a4 has the lowest priority of any value in the cache. Thus, the transformation tool retains in the cache the called-for values having the highest priority. Because b1 is the first called-for value, the output controller (not shown) takes the value b1 from the cache and writes it in the first position 422 of the result document and requests the next called-for value, b2. The memory location in the cache is made available for another value from the source document. The parser sequentially locates b2 which, in this example, is the next value in the source document. This value, b2, may be placed in the available memory space in the cache 412. Because this is the next called-for value in the result document, the output controller takes the value b2 from the cache and puts it in the next position 424 of the result document and requests the next called-for value, b3. The memory location in the cache is made available for another value from the source document. Similarly, the transformation tool locates, stores and writes b3 and b4 to the result document locations 426, 428, respectively, as the parser sequentially parses the source document. The values in the cache are shown 414, 416, respectively. After the output controller writes b4 to the result document at 428, the controller calls for the next called-for value, a3. This value a3 is available in the storage cache 416 because the transformation tool had retained the highest priority values in the cache. The value a4 may be written to the result document at 430 without further parsing of the source document. Similarly, the sequentially called-for values a1 and a2 are available in the cache 416 and may be written to the result document without further parsing of the input document.

The parser 416 in this example has completed the first sequential pass through the source document 402 and the storage cache memory locations are available all available. The output controller requests the next called-for value, a4. In the second sequential pass of the parser through the source document, the parser will locate the value a4 and store the value in the cache 418. The output controller takes the value a4 from the cache and writes it to the result document at 436 and requests the next called-for value, a5. The parser continues through the source document locating, in order, the called-for values a5-a9 each of which, in turn, is written by the output controller to the result document. In this example, the result document 404 is populated with all the called-for values from the source document 402 in two passes of the parser 416 through the source document.

Figure 5:
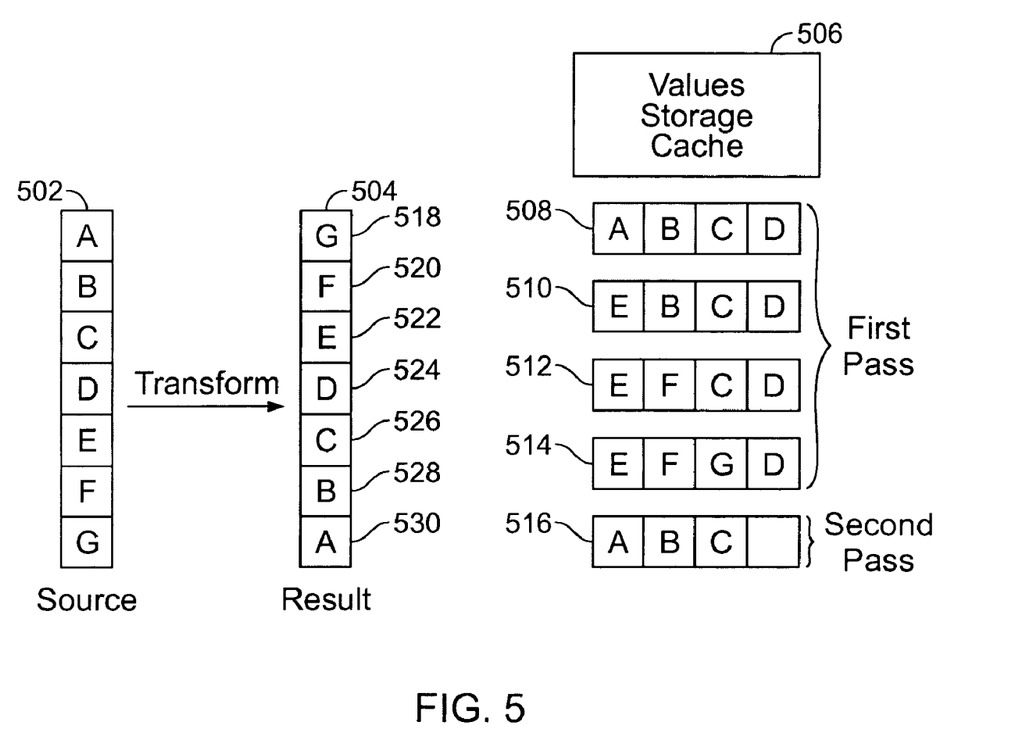
FIG. 5 is another example of the values stored in a storage cache by the transformation tool based on the priority of the values.

FIG. 5 is another example of the storage of high priority values in a cache when transforming a source document 502 to a result document 504. In this example, the values in the source document 502 are all called for in the result document but the order, or priority, of the values in the result is the reverse of the sequential order of the values in the source. As in the example of FIG. 4, the storage cache of FIG. 5 has a predetermined storage size for four values. As described above, as a parser (not shown) sequentially parses the source document 502, the values called for in the result document are stored in a values storage cache 506. Only those values that are called-for by the result document are stored in the storage cache. The parser sequentially parses the source document 502 and the called-for values A-D are put into the four storage cache locations 508. When the parser reaches the called-for value E the storage cache is full. The value A in the storage cache has the lowest priority, that is, called for latest sequentially, of all the values in the storage cache 508. Called-for value E replaces value A in the storage cache 510 because the priority of value E is higher than that of A. Thus, as before, the storage cache retains the four values with the highest priority of the called-for values located by the parser. The parser next locates the called-for value F. The value in the storage cache 510 with the lowest priority is the value B. Called-for value F replaces value B in the storage cache 512 because the priority of value F is higher than that of B. The parser next locates the called-for value G at the end of the first pass through the source document. The value in the storage cache 512 with the lowest priority is the value C. Called-for value G replaces value C in the storage cache 514 because the priority of value G is higher than that of C.

Value G has the highest priority and the output controller (not shown) has called for this value as the first sequential value in the result document. The output controller wakes up and writes this value to the first position 518 of the result document 504. The output controller next requests value F. This value is already in the storage cache because the storage cache has retained the values with the highest priority. Value F is also written to the output document at 520. Similarly, values E and D are sequentially requested by the output controller, found in the storage cache and written to the output document at 522 and 524, respectively.

The storage cache, in this example, has been emptied. The output controller requests the next sequential value, C. The parser, having completed a first pass through the source document 502, begins a second pass to locate the called-for values. The parser locates sequentially the called-for values A, B and C, in that order, and places the values in the storage cache 516. The output controller writes the value C to the result document at 526 and requests value B, the next called-for value. Value B is in the memory cache and is written to the result document at 528. Similarly, value A is in the cache and is also written to the result document at 530. In this example, the result document was populated with values from the source document with two passes of the parser through the source document when the storage cache had a predetermined size.

Figure 6:
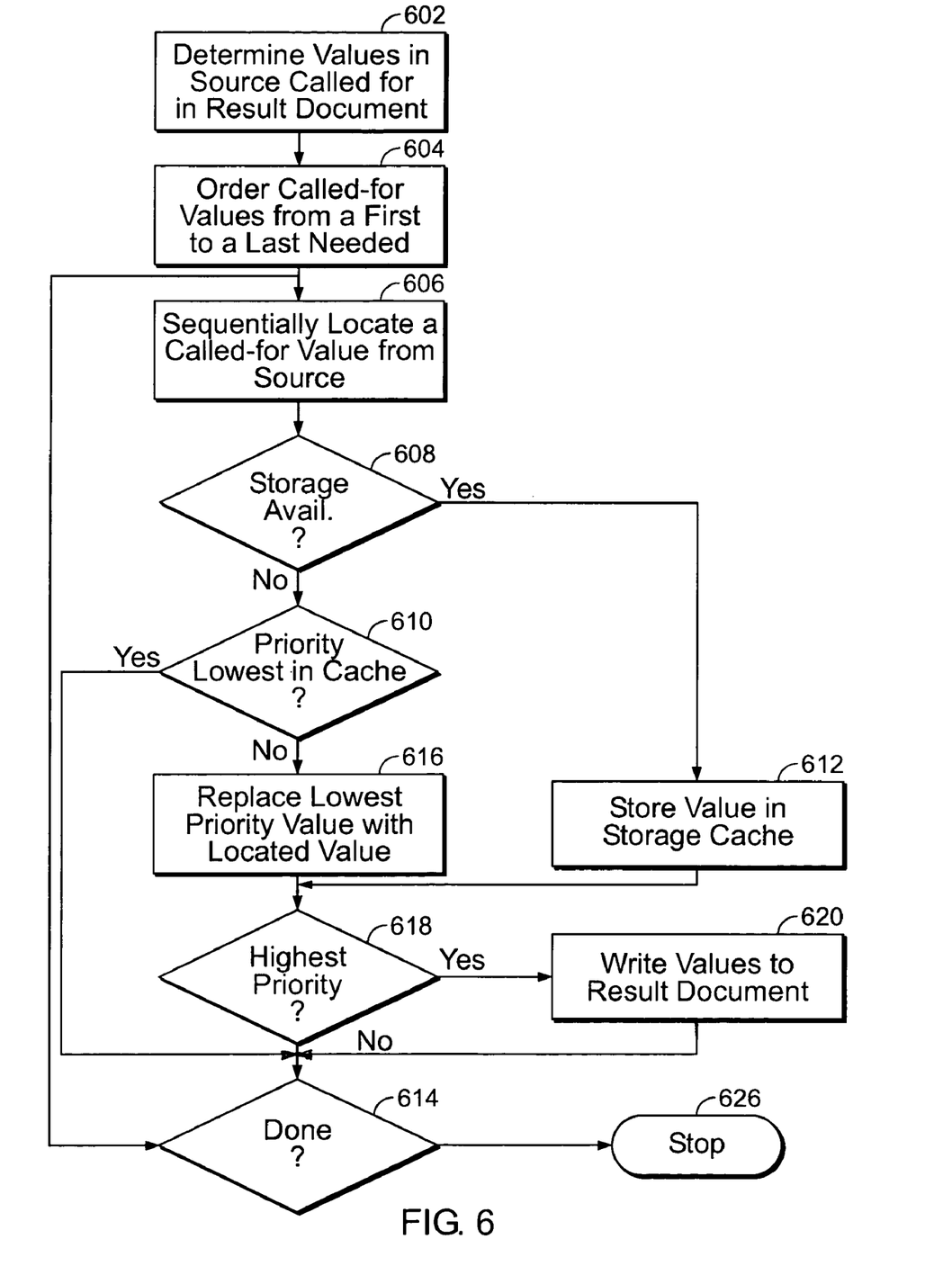
FIG. 6 is a flow chart of an implementation of a document transformation tool Like reference numbers and designations in the various drawings indicate like elements.

FIG. 6 is a flow chart 600 of an implementation of a document transformation tool in accordance with the present disclosure. The values required in a result document are determined 602. Because the values are written to the result document sequentially, the value that is called for first is given the highest priority. Other called-for values are ordered 604 by sequential need so that the first called-for values have a higher priority than later called-for values.

A source file is parsed to locate 606 the called-for values. Values called for in the result document may be stored in a storage cache until the value is written to the result document. In the transformation tool of the present disclosure, the source and result files may only be parsed sequentially toward the end of the documents. To return to a prior location in either document may require a parser to restart parsing from the beginning. The parser may not go backwards in the document. When a newly found value called for in the result document is located, the storage cache is queried 608 to determine if there is an available location for storage of the called-for value. If a storage location is available, the newly found value is stored 612 in the storage cache. The transformation tool proceeds to determine if the value with the highest priority 618 called for is in the cache as discussed below. If a storage location is not available 608, the priority of the newly found value is compared to the value in the storage cache with the lowest priority. If the priority of the newly found value is lower than the lowest priority value 610 in the cache, the newly found value is not stored in the cache and the transformation tool determines 614 if all the values in the source document have been found. If the newly found called-for value has a priority greater 610 than the value in the cache with the lowest priority, the newly found called-for value replaces 616 the value in the cache with the lowest priority. The storage cache is searched to determine if the value with the highest priority 618 called for is in the cache. If so, the value with the highest priority is written 620 to the result document. The cache is searched for sequentially highest priority values and these may also be written to the result document.

If the value with the highest priority 618 called for is not in the cache, the transformation tool determines 614 if there are more values called for from the source document. If no more values are called for at 614 the transformation is completed and stops parsing the source document 626. If there are more values called for 614 in the result document, the transformation tool continues to sequentially locate 606 values in the source document that are called for in the result document. The sequential searching and storage of the highest priority values in the storage cache continues until all the result document values are located.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims.

What is claimed is:

1. A method comprising:
   as part of a first pass through all values of a source file, populating a cache with values from the source file; and
   if the cache is full, determining whether a first next value of the source file is to replace a first value in cache, the first value to be replaced with the first next value if the first value in the cache is called-for in a result file subsequent to the first next value, the result file comprising references to values, the values referred to in the result file being called-for values, the first value being called-for in the result file by one of the references, and an order of the called-for values of the result file being different from an order of values in the source file, the source file having more values than entries in the cache;
   populating the result file with values from the cache from the first pass;
   as part of subsequent passes through the source file, populating the cache with values from the source file that are called-for in the result file later than values of the cache at the end of the first pass; and if the cache is full, determining whether a second next value of the source file is to replace a second value in the cache, the second value to be replaced with the second next value if the second value in the cache is called-for in a result file subsequent to the second next value; and appending the result file with values from the cache from the subsequent passes.

2. The method of claim 1, wherein the populating and the appending of the result file with values from the cache from the first and subsequent passes, respectively, is performed by a thread separate from a thread populating the cache as part of the first and subsequent passes, and the populating of the result file occurs at least in part of the first pass through the source file.

3. The method of claim 1, wherein the source file is an Extensible Mark-up File.

4. The method of claim 1, wherein the result file is an Extensible Mark-up File.

5. An article comprising a tangible machine-readable medium storing machine-executable instructions that, when executed, cause a machine to perform operations comprising:

as part of a first pass through all values of a source file, populating a cache with values from the source file; and if the cache is full, determining whether a first next value of the source file is to replace a first value in cache, the first value to be replaced with the first next value if the first value in the cache is called-for in a result file subsequent to the first next value, the result file comprising references to values, the values referred to in the result file being called-for values, the first value being called-for in the result file by one of the references, and an order of the called-for values of the result file being different from an order of values in the source file, the source file having more values than entries in the cache;

populating the result file with values from the cache from the first pass;

as part of subsequent passes through the source file, populating the cache with values from the source file that are called-for in the result file later than values of the cache at the end of the first pass; and if the cache is full, determining whether a second next value of the source file is to replace a second value in the cache, the second value to be replaced with the second next value if the second value in the cache is called-for in a result file subsequent to the second next value; and appending the result file with values from the cache from the subsequent passes.

6. The article of claim 5, wherein the populating and the appending of the result file with values from the cache from the first and subsequent passes, respectively, is performed by a thread separate from a thread populating the cache as part of the first and subsequent passes, and the populating of the result file occurs at least in part of the first pass through the source file.

7. The article of claim 5, wherein the source file is an Extensible Mark-up File.

8. The article of claim 5, wherein the result file is an Extensible Mark-up File.

9. A system for using a memory cache, the system comprising one or more computers configured to:

as part of a first pass through all values of a source file, populating a cache with values from the source file; and if the cache is full, determining whether a first next value of the source file is to replace a first value in cache, the first value to be replaced with the first next value if the first value in the cache is called-for in a result file subsequent to the first next value, the result file comprising references to values, the values referred to in the result file being called-for values, the first value being called-for in the result file by one of the references, and an order of the called-for values of the result file being different from an order of values in the source file, the source file having more values than entries in the cache;

populating the result file with values from the cache from the first pass;

as part of subsequent passes through the source file, populating the cache with values from the source file that are called-for in the result file later than values of the cache at the end of the first pass; and if the cache is full, determining whether a second next value of the source file is to replace a second value in the cache, the second value to be replaced with the second next value if the second value in the cache is called-for in a result file subsequent to the second next value; and appending the result file with values from the cache from the subsequent passes.

10. The system of claim 9, wherein the populating and the appending of the result file with values from the cache from the first and subsequent passes, respectively, is performed by a thread separate from a thread populating the cache as part of the first and subsequent passes, and the populating of the result file occurs at least in part of the first pass through the source file.

11. The system of claim 9, wherein the source file is an Extensible Mark-up File.

12. The system of claim 9, wherein the result file is an Extensible Mark-up File.

13. An apparatus comprising:

Means for parsing that as part of a first pass through all values of a source file, populates a cache with values from the source file; and if the cache is full, determines whether a first next value of the source file is to replace a first value in cache, the first value to be replaced with the first next value if the first value in the cache is called-for in a result file subsequent to the first next value, the result file comprising references to values, the values referred to in the result file being called-for values, the first value being called-for in the result file by one of the references, and an order of the called-for values of the result file being different from an order of values in the source file, the source file having more values than entries in the cache; populates the result file with values from the cache from the first pass; and as part of subsequent passes through the source file, populates the cache with values from the source file that are called-for in the result file later than values of the cache at the end of the first pass; and if the cache is full, determines whether a second next value of the source file is to replace a second value in the cache, the second value to be replaced with the second next value if the second value in the cache is called-for in a result file subsequent to the second next value; and appends the result file with values from the cache from the subsequent passes.

14. The apparatus of claim 13, wherein
the populating and the appending of the result file with values from the cache from the first and subsequent passes, respectively, is performed by a thread separate from a thread populating the cache as part of the first and subsequent passes, and the populating of the result file occurs at least in part of the first pass through the source file.

15. The apparatus of claim 13, wherein the source file is an Extensible Mark-up File.

16. The apparatus of claim 13, wherein the result file is an Extensible Mark-up File.

* * * * *